_United States Patent_ [19]

Ida et al.

[11] Patent Number: 4,849,586
[45] Date of Patent: Jul. 18, 1989

[54] SLIP RING HAVING A ROTATABLE INSULATION COVER

[75] Inventors: Yuichi Ida; Kiichi Yamaguchi; Hironori Kato, all of Miyagi, Japan

[73] Assignee: Alps Electric Co., Ltd., Japan

[21] Appl. No.: 160,914

[22] Filed: Feb. 26, 1988

[30] Foreign Application Priority Data

May 27, 1987 [JP] Japan ............................. 62-78736[U]

[51] Int. Cl.⁴ .............................................. H01H 9/00
[52] U.S. Cl. .................................... 200/61.54; 439/15
[58] Field of Search ............ 439/15; 200/61.54, 61.55, 200/61.56, 61.57, 164 R

[56] References Cited

U.S. PATENT DOCUMENTS 4,380,341  4/1983  Waldschutz et al. ........ 200/61.55 X
4,547,636  10/1985  Mizuno et al. .................. 200/61.54

_Primary Examiner_—A. D. Pellinen
_Assistant Examiner_—Morris Ginsburg
_Attorney, Agent, or Firm_—Guy W. Shoup; Paul J. Winters; Stephen L. Malaska

[57] ABSTRACT

A slip ring wherein electric disconnection which may possibly arise from freezing of drops of condensed water is prevented with a simplified construction. The slip ring is of the type wherein electric connection between a fixed member and a movable member mounted for rotation relative to the fixed member is established by means of an annular conductive plate and a contact element mounted in mutual contact on one and the other of the fixed and movable members. The slip ring comprises an insulating cover mounted for rotation on the conductive plate and covering an annular face of the conductive plate. The cover has an opening formed therein through which the contact element is resiliently contacted with the conductive plate.

3 Claims, 2 Drawing Sheets

SLIP RING HAVING A ROTATABLE INSULATION COVER

BACKGROUND OF THE INVENTION

The invention relates to a slip ring of the type wherein electric connection between a fixed member and a movable member is established by physical contact between a conductive plate and a contact element.

A slip ring of the type mentioned is used as an electric connecting device for transmitting an electric signal between a movable member and fixed member and is incorporated, for example, in a steering device of an automobile wherein it couples a horn signal or the like from the steering wheel (movable member) side to the bearing (fixed member) side.

Conventional slip rings typically have such a structure that, for example, a plurality of ring-shaped conductive plates corresponding to a required number of circuits are located in a concentrical relationship on a surface of a fixed member while a number of contact elements corresponding to the individual conductive plates are located in a predetermined spaced relationship in a diametrical direction on a movable member, whereby electric connection between the movable member and the fixed member is established by sliding contact of the contact elements with the conductive plates when the movable member is rotated.

Such a conventional slip ring is sometimes used in a severe condition in which the temperature varies very widely. If the slip ring is exposed, for example, from a low temperature condition to a high temperature condition, then air thus warmed will be cooled suddenly near around boundary faces of the conductive plates so that water in the air will be condensed into dew. Accordingly, it is a problem that, if the slip ring is exposed to a low temperature condition again, drops of water of the dew may freeze into ice on the slip ring. Once such frozen pieces of ice resulting from dew condensation appear on surfaces of the conductive plates, they will interrupt electric connection between the conductive plates and the contact elements, which will result in failure in electric connection of the slip ring which is a serious defect to the slip ring.

An improved slip ring has been already provided wherein a heat source such as a heater is located near conductive plates in order to prevent such condensed water from freezing. The slip ring, however, has a drawback that the overall size thereof is increased and its production cost is increased remarkably.

SUMMARY OF THE INVENTION

It is an object of the present invention to provide a slip ring wherein electric disconnection which may possible arise from freezing of drops of condensed water is prevented with a simplified construction.

In order to attain the object, according to the present invention, there is provided a slip ring of the type wherein electric connection between a fixed member and a movable member which is mounted for rotation relative to the fixed member is established by means of a substantially annular conductive plate located on one of the fixed member and the movable member and a contact element located on the other of the fixed element and the movable member and held in contact with the conductive plate, which comprises an insulating cover mounted for rotation on the conductive plate and covering an annular face of the conductive plate, the cover having an opening formed therein through which the contact element is resiliently contacted with the conductive plate.

With the slip ring of the present invention, the sliding face of the conductive plate is always covered closely by the cover except the portion of the conductive plate which is contacted with the contact element. Accordingly, while dew condensation and freezing may appear on the surface of the cover, they will little appear on the surface of the conductive plate. Consequently, failure in electric connection between the conductive plate and the contact element which may possible be caused by freezing of condensed water drops can be prevented.

Thus, according to the present invention, a slip ring which minimizes its failure in electric connection arising from freezing of water thereon can be provided at a low cost.

The above and other objects, features and advantages of the present invention will become apparent from the following description and the appended claims, taken in conjunction with the accompanying drawings.

DETAILED DESCRIPTION OF THE PREFERRED EMBODIMENTS

Figure 1:
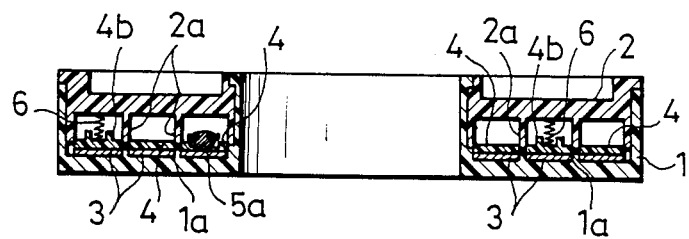
FIG. 1 is an axial vertical sectional view of a slip ring showing a preferred embodiment of the present invention.
Figure 2:
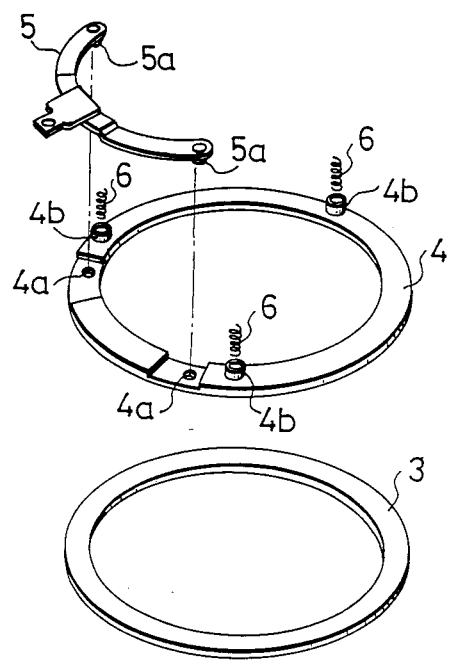
FIG. 2 is a fragmentary perspective view of several components of the slip ring of FIG. 2.

Referring first to FIGS. 1 and 2, there is shown a slip ring according to a preferred embodiment of the present invention. The slip ring shown includes a lower casing 1 serving as a fixed member, and an upper casing 2 serving as a movable member. The lower and upper casings 1 and 2 are snap-coupled at widthwise central portions thereof for relative rotation to each other. A plurality of, two in the embodiment, partition walls 1a are formed uprightly in a concentrical relationship to each other on an inner face of a bottom wall of the lower casing 1, and a plurality of, three in the embodiment, annular conductive plates 3 made of a suitable conductive material such as brass are located between adjacent ones of the partition walls 1a and inner and outer circumferential walls of the lower casing 1. The conductive plates 3 are integrally fixed to the lower casing 1 by a suitable means such as riveting or outsert molding and are led out, though not shown, to a location outside the lower casing 1. A cover 4 made of a synthetic resin material is placed on each of the conducting plates 3. As can be apparently seen in FIG. 2, the cover 4 has a generally annular shape similar to a corresponding one of the conductive plates 3 but has a pair of perforations 4a formed at recessed portions thereof and a plurality of, three in the embodiment, spring receiving projections 4b formed on an upper face thereof.

Meanwhile, a plurality of, two in the embodiment, partition walls 2a are formed vertically downwardly in a concentrical relationship to each other on a lower face of the upper casing 2 in an opposing relationship to the partition walls 1a of the lower casing 1. A contact element 5 formed from an elastic metal plate is located in each of adjacent ones of the partition walls 2a and inner and outer circumferential walls of the upper casing 2. The contact elements 5 are mounted on the upper casing 2 by a suitable fixing means such as thermal caulking or riveting and are led out, though not shown, to a location outside the upper casing 2. A pair of contacts 5a are mounted at opposite free ends of each of the contact elements 5. The contacts 5a of the contact element 5 extend through the perforations 4a of the corresponding cover 4 and are pressed against a surface of the corresponding conductive plate 3 by a spring force of the contact element 5. A compression coil spring 6 is interposed between the lower face of the upper casing 2 and each of the spring receiving portions 4b of the cover 4 for urging the cover 4 to contact under pressure with the surface of the corresponding conductive plate 3.

Accordingly, as the upper casing 2 is rotated, the contacts 5a of the contact elements 5 and the covers 4 are slidably moved on the respective conductive plates 3. Accordingly, electric connection between a movable side member such as a steering wheel connected to the upper casing 2 and a fixed side member on which the lower casing 1 is mounted is always maintained by way of the contact elements 5 and the conductive plates 3.

In the slip ring of the embodiment described above, the covers 4 cover over all the areas of the conducting plates 3 except those portions with which the contacts 5a of the contact elements 5 are contacted, and are contacted under pressure with the surfaces of the conductive plate 3 by the urging forces of the springs 6. Accordingly, the exposed areas of the conductive plates 3 can be minimized while maintaining the contacting condition between the contact elements 5 and the conductive plates 3. Therefore, when the slip ring is exposed from a low temperature condition to a high temperature condition, dew condensation may appear on the surfaces of the covers 4 but will little appear on the surfaces of the conductive plates 3 so that, even if the slip ring is exposed to a low temperature condition again, freezing of condensed water drops which will cause electric disconnection of the slip ring will little appear on the surfaces of the conductive plates 3.

It is to be noted that while in the embodiment described above the compression coil springs 6 are used to contact the covers 4 under pressure with the surfaces of the conductive plates 3, it is possible to use leaf springs in place of the compression coil springs or to form, in place of the compression coil springs, elastic pieces or fingers in an integral relationship on the covers 4 by molding. Further, if restraining pins and/or engaging holes are provided on the upper casing 2 and the covers 4 for restraining relative movement of the upper casing 2 and the covers 4 in a direction of relative rotation of them, the turning force of the upper casing 2 can be transmitted more certainly to the covers 4.

Figure 3:
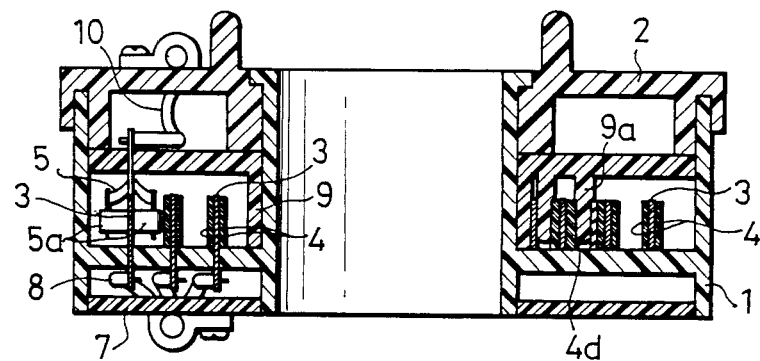
FIG. 3 is an axial vertical sectional view taken along line A—A of FIG. 4 showing another preferred embodiment of the present invention.
Figure 4:
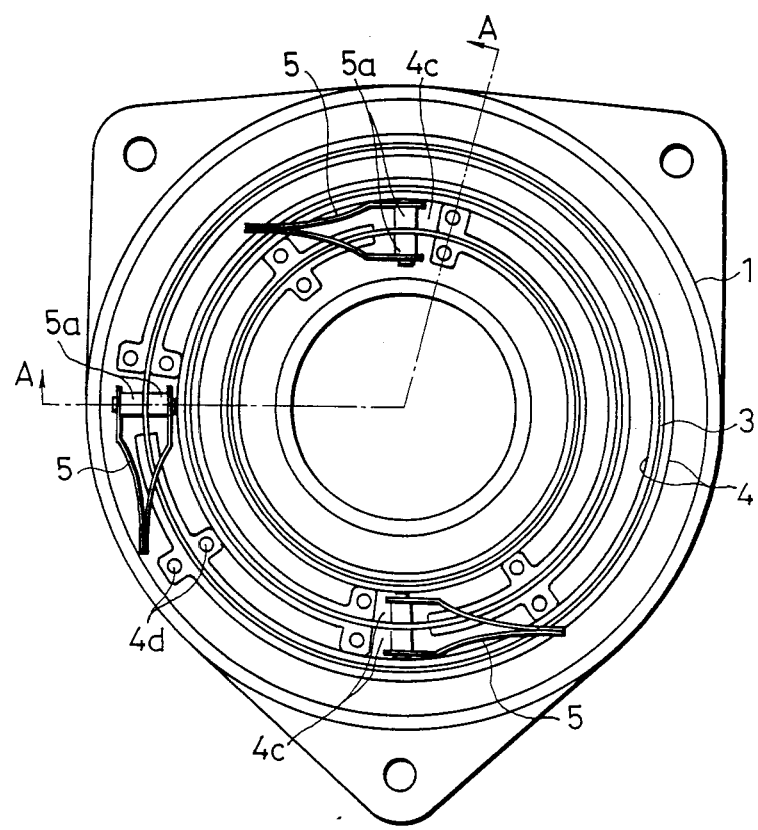
FIG. 4 is a plan view of the slip ring of FIG. 3 with its movable member removed.

Referring now to FIGS. 3 and 4, there is shown another slip ring of a second embodiment of the present invention. It is to be noted that like parts or elements are denoted by like reference numerals to those of FIGS. 1 and 2.

The slip ring shown includes a lid member 7 for covering a lower open end of a lower casing 1. The lid member 7 constitutes a fixed member together with the lower casing 1. A plurality of, three in the present embodiment, conductive plates 3 are located uprightly in a concentrical relationship to each other in cylindrical planes on an inner face of a bottom wall of the lower casing 1 and are led out to a location outside the lid member 7 by way of lead wires 8 soldered to lower ends of the conductive plates 3.

The slip ring further includes a holder 9 attached in an integral relationship to a lower face of an upper casing 2. The holder 9 constitutes a movable member together with the upper casing 2. A plurality of, three in the present embodiment, contact elements 5 corresponding to the conductive elements 3 are mounted on the holder 9 and are led out to a location outside the upper casing 2 by way of lead wires 10 soldered to upper ends of the contact elements 5. Each of the contact elements 5 is bifurcated to provide two legs each of which has a contact 5a mounted at a free end thereof. The contacts 5a of each of the contact elements 5 are resiliently contacted with inner and outer circumferential faces of a corresponding one of the conductive plates 3, and the entire inner and outer circumferential faces of each of the conductive plates 3 are covered with a pair of covers 4 except the areas which are contacted by the contact elements 5a. As apparently seen in FIG. 4, the covers 4 have generally cylindrical shapes and each has an opening 4c formed therein and a pair of engaging holes 4d formed at opposite end portions thereof adjacent the opening 4c. Meanwhile, a plurality of engaging pins 9a are formed vertically downwardly on a lower face of the holder 9 as shown in FIG. 3, and as the engaging pins 9a are fitted individually into the engaging holes 4d of the covers 4, the covers 4 are mounted in an integral relationship on the holder 9 and are held in close contact with the opposite circumferential faces of the conductive plates 3.

With the embodiment having such a construction as described above, if the movable member (upper casing 2 and holder 9) is rotated, the covers 4 are slidably moved on the inner and outer circumferential faces of the conductive plates 3 and the contacts 5a of the contact elements 5 are also slidable moved on the inner and outer circumferential faces of the conductive plates 3 through the openings 4c of the cover 4, thereby to maintain electric connection between the movable member and the fixed member. Also in the present embodiment, the sliding faces of the conductive plates 3 are covered by the covers 4 except those portions which are exposed by the recesses 4c of the covers 4. Accordingly, while dew condensation or freezing may appear on surfaces of the covers 4, it will little appear on the sliding faces of the conductive plates 3. Consequently, failure in electric connection arising from freezing of condensed water drops can be prevented.

It is to be noted that while in the embodiments described above the covers 4 are made of a synthetic resin material, they may be made of any other material or may each have any other form if it presents a substantial insulating property and, for example, each of the covers 4 may be a metal plate which is coated with an insulating material such as a fluorocarbon resin.

Further, the covers 4 need not cover over the full width of the conductive plates 3 as in the embodiments described above and may be of any configuration if they can sufficiently cover over the entire loci of sliding movement of the contacts 5a of the contact elements 5 on the conductive plates 3.

Having now fully described the invention, it will be apparent to one of ordinary skill in the art that many changes and modifications can be made thereto without departing from the spirit and scope of the invention as set forth herein.

What is claimed is:

1. A slip ring of the type wherein electric connection between a fixed member and a movable member which is mounted for rotation relative to said fixed member is established by means of a substantially annular conductive plate having a substantially annular conductive surface located on one of said fixed member and said movable member, and a contact element located on the other of said fixed member and said movable member and held in contact with said annular conductive surface of said conductive plate; comprising an insulation cover mounted for rotation on said conductive plate and covering said annular conductive surface of said conductive plate, said cover defining an opening through which said contact element is resiliently contacted with said annular conductive surface of said conductive plate.

2. A slip ring according to claim 1, further comprising at least one additional conductive plate and at least one additional cover corresponding to said conductive plate, all of said conductive plates being disposed in a concentrical relationship to each other, each of said covers being resiliently contacted with an upper face of a corresponding one of said conductive plates by an urging member while said contact element is also resiliently contacted with said upper face of the corresponding conductive plate.

3. A slip ring according to claim 1, wherein said conductive plate is provided uprightly on one of said fixed and movable members, and said contact element is resiliently contacted with inner and outer circumferential faces of said conductive plate.

* * * * *